United States Patent
Gengler et al.

(10) Patent No.: US 6,209,656 B1
(45) Date of Patent: Apr. 3, 2001

(54) APPARATUS AND METHOD FOR CONTROLLING THE POSITION OF AN ARM ON A HITCH

(75) Inventors: Eric P. Gengler; Jeffrey M. Thate, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/409,186

(22) Filed: Sep. 30, 1999

(51) Int. Cl.$^7$ .................................................. A01B 63/112
(52) U.S. Cl. ....................................................... 172/2; 701/5
(58) Field of Search ............................... 701/5; 172/2, 4, 172/3, 4.5, 7, 8

(56) References Cited

U.S. PATENT DOCUMENTS

| | | | |
|---|---|---|---|
| 4,268,057 | 5/1981 | Engelmann et al. | 280/474 |
| 4,304,303 | 12/1981 | Lange | 172/239 |
| 4,645,226 | 2/1987 | Gustavsson et al. | 280/423 |
| 4,837,691 | 6/1989 | Boe et al. | 364/424.05 |
| 4,852,657 | 8/1989 | Hardy et al. | 172/2 |
| 4,979,092 | 12/1990 | Bergene et al. | 364/148 |
| 5,012,415 | 4/1991 | Boe et al. | 364/424.07 |
| 5,143,159 | 9/1992 | Young et al. | 172/8 |
| 5,170,849 | 12/1992 | Nikkel et al. | 172/6 |
| 5,246,077 | 9/1993 | Tjaden et al. | 172/450 |
| 5,549,166 | 8/1996 | Orbach et al. | 172/4 |
| 5,697,454 | 12/1997 | Wilcox et al. | 172/447 |
| 5,823,270 | 10/1998 | Cooper | 172/439 |

FOREIGN PATENT DOCUMENTS 19611626   11/1997   (DE) .

*Primary Examiner*—Christopher J. Novosad
(74) *Attorney, Agent, or Firm*—Clifton G. Green

(57) ABSTRACT

An apparatus for controlling a lateral position of a first member on a hitch of a work machine. A first processing device receives a first signal indicative of a desired turn radius of the work machine and transmits a first desired hitch position as a function of the first signal. A second processing device receives a second signal indicative of an actual hitch position and also receives the first desired hitch position. The second processing device transmits a first error as a function of the second signal and the desired hitch position. A controller receives the first error and transmits a second error as a function of the first error. A first member modulator receives the first error and transmits a first activation signal as a function of the second error. The first activation signal controls the lateral position of the first member.

20 Claims, 2 Drawing Sheets

APPARATUS AND METHOD FOR CONTROLLING THE POSITION OF AN ARM ON A HITCH

TECHNICAL FIELD

This invention relates generally to position control of a member, and more specifically, to a method and apparatus for controlling the lateral position of an arm of a hitch.

BACKGROUND ART

Most conventional hitches have a pivot point to allow articulation between an implement coupled with a hitch, such as a plow, and a work machine to which the hitch is attached, such as a tractor. In addition to the pivot point, some hitches allow the pivot point to be manually shifted a short distance laterally, i.e., horizontally, with respect to the tractor.

Conventional hitch systems that allow lateral shifting typically operate in two ways. A pivoting wand or other similar device used for row guidance provides the input indicating the desired offset of the hitch. Typically the wand is suspended from the implement, and is dragged along the ground in contact with a row of crops. When the position of the implement changes relative to the row of crops, the angle of the wand changes. As the angle changes, an appropriate offset of the hitch may be made to prevent the implement from overrunning and causing damage to the row of crops.

Alternately, a manual lever, such as a joystick, or a discrete switch, is toggled to trigger movement by the hitch. For example, when an operator is attempting to hook up an implement with the tractor, often the hitch is not properly aligned with the implement. Instead of requiring the operator to re-align the tractor, the operator may simply adjust the lateral position of the hitch. In addition, a manual lever allows the operator to shift the hitch, and any implement connected to it, to one side. This allows for a more precise positioning of the implement during a variety of field operations.

It has been suggested by some that a hitch may be used to provide a positive steering force to assist during turns of the tractor with the implement in the soil. However, no satisfactory system for accomplishing this has been disclosed. Hitches that use row guidance sensors are clearly not suited for this task. These systems control the position of the hitch solely based on the position of the crop rows, and where no crop row is present, provide no guidance. The manual lever could be used to offset the hitch in this situation. The manual lever, however, provides an additional task for the operator to monitor and respond to. Due to the increasing complexity of modern tractors, it is undesirable to provide additional systems that vie for the attention of the operator while the tractor is in motion.

DISCLOSURE OF THE INVENTION

The present invention provides an apparatus and methods for controlling a lateral position of a first member on a hitch of a work machine. A first processing device receives a first signal indicative of a desired turn radius of the work machine and transmits a first desired hitch position as a function of the first signal. A second processing device receives a second signal indicative of an actual hitch position and also receives the first desired hitch position. The second processing device transmits a first error as a function of the second signal and the desired hitch position. A controller receives the first error and transmits a second error as a function of the first error. A first member modulator receives the first error and transmits a first activation signal as a function of the second error. The first activation signal controls the lateral position of the first member.

BEST MODE FOR CARRYING OUT THE INVENTION

Figure 1:
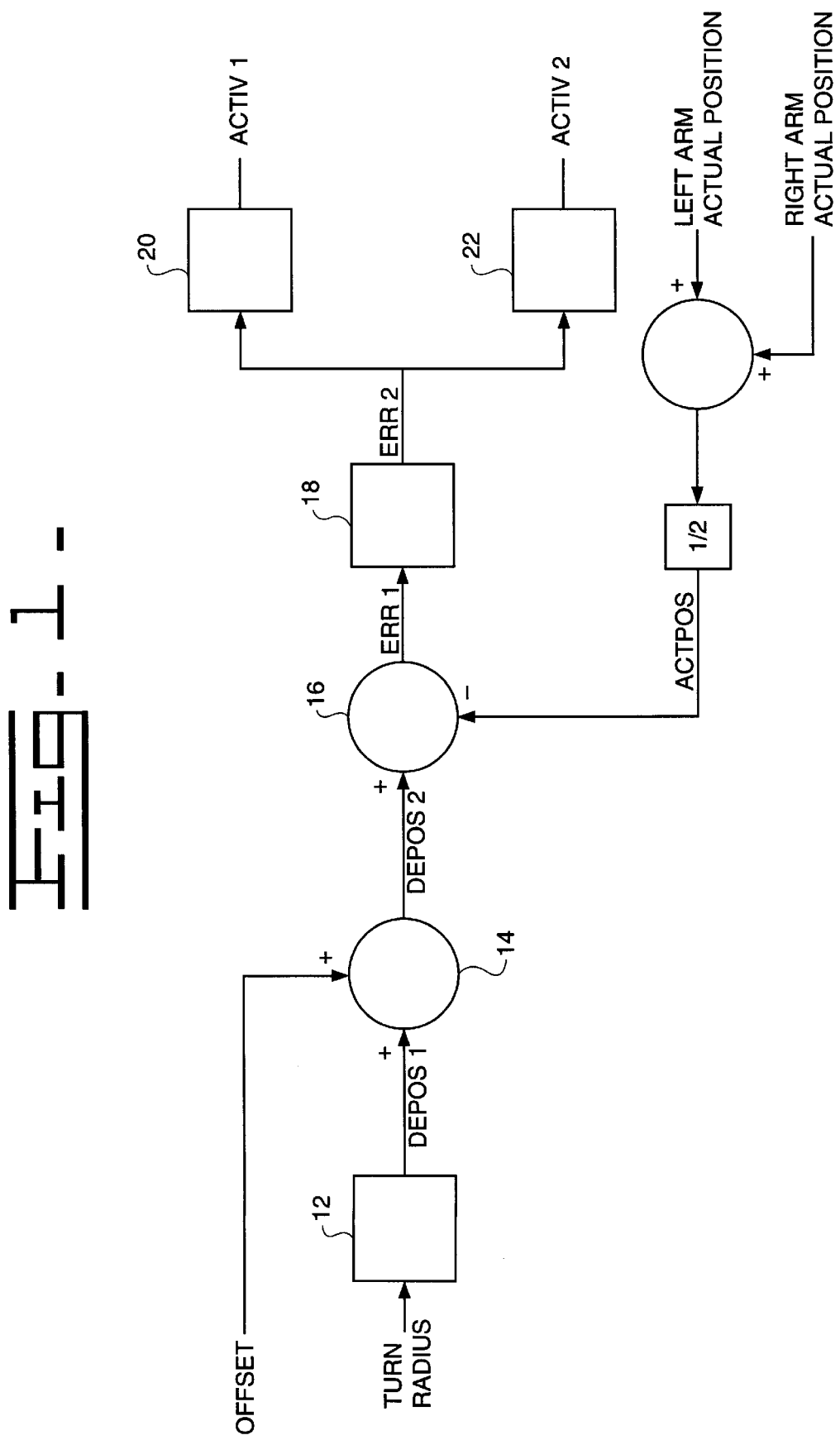
FIG. 1 is a functional block diagram of an apparatus for controlling the lateral position of a member on a hitch of a work machine.

FIG. 1 is a functional block diagram of an apparatus 10 for controlling the lateral position of a member, such as an arm, on a hitch of a work machine. A first processing device 12 receives a first signal indicative of a turn radius ("TURN RADIUS") of a work machine (not shown). The first signal typically includes both a magnitude and direction, i.e., a left or a right turn, of the turn radius. The first signal TURN RADIUS may be received from a first control input of the work machine, such as a steering wheel (not shown), or more typically, is a processed signal that is a function of the position of the steering wheel. The first processing device 12 determines and transmits a first desired hitch position ("DESPOS1") as a function of the first signal TURN RADIUS. The first desired hitch position DESPOS1 typically corresponds to a desired position of an arm of the hitch. In a preferred embodiment, the hitch includes two arms, and the first desired hitch position DESPOS1 corresponds to a desired centerline position. An actual centerline position corresponds to an average of the left and right arm positions, i.e., a position approximately halfway between the two arms. In another embodiment, a single arm position is used. In this embodiment, the centerline position is determined by the single arm position and a calibration offset.

In one embodiment, a second processing device 14 is coupled with the first processing device 12 to receive the first desired hitch position DESPOS1. The second processing device 14 also receives a second signal indicative of a desired offset position ("OFFSET"). The second signal OFFSET may be received from a second control input of a work machine, such as a dial or lever arm (not shown). The second processing device 14 determines and transmits a second desired hitch position ("DESPOS2") as a function of the first desired hitch position DESPOS1 and the second signal OFFSET. Typically the second desired hitch position DESPOS2 is equal to the sum of the first desired hitch position DESPOS1 and the desired offset position OFFSET, although other relationships are also possible.

In one embodiment, a third processing device 16 is coupled with the second processing device 14 to receive the second desired hitch position DESPOS2. In embodiments where the second processing device 14 is not used, the third processing device 16 may be coupled with the first processing device 12 to receive the first desired hitch position DESPOS1. The third processing device 16 also receives a third signal indicative of an actual position ("ACTPOS") of at least one of the arms of the hitch, or more typically an actual position of the centerline. The third processing device 16 determines and transmits a first error ("ERR1") as a function of the desired hitch position DESPOS1/DESPOS2 and the actual hitch position ACTPOS. Typically the first error ERR1 equals the desired hitch position DESPOS1/DESPOS2 minus the actual hitch position ACTPOS, although other relationships are also possible.

A controller 18 is coupled with the third processing device 16 to receive the first error ERR1. The controller 18 determines and transmits a second error ("ERR2") as a function of the first error ERR1. In a preferred embodiment, the controller 18 is a proportional, integral, and feed-forward ("PI-FF") controller of a type known to those skilled in the art, although other types of controllers may also be used, e.g., a PI or a PID controller.

A first member modulator 20 is coupled with the controller 18 to receive the second error ERR2. The first member modulator 20 transmits a first activation signal ("ACTIV1") as a function of the second error ERR2. The first activation signal ACTIV1 may be used to control the position, such as a lateral position, of a first arm of the hitch. The first activation signal ACTIV1 may be sent to a first portion of a hydraulic pump system, such as a first solenoid of a first pilot valve. The first activation signal ACTIV1 actuates the first solenoid, thereby causing the first and second hydraulic cylinders to extend or contract by ways known to those skilled in the art.

In one embodiment, a second member modulator 22 is coupled with the controller 18 to receive the second error ERR2. The second member modulator 22 transmits a second activation signal ("ACTIV2") as a function of the second error ERR2. The second activation signal ACTIV2 may also be used to control the position, such as a lateral position, of the first arm of the hitch. In a preferred embodiment, the second activation signal ACTIV2 is typically complementary to the first activation signal ACTIV1. The second activation signal ACTIV1 may be sent to a second portion of the hydraulic pump system, such as a second solenoid of the first pilot valve. The second activation signal ACTIV2 actuates the second solenoid, thereby causing the first and second hydraulic cylinders to extend or contract by ways known to those skilled in the art.

Generally, the hydraulics are plumbed so that when the first solenoid is activated, the first pilot valve is actuated in a first direction, and when the second solenoid is actuated, the first pilot valve is actuated in the opposite direction. When the first pilot valve is actuated in the first direction, it generally causes a flow of hydraulic fluid to the rod end of one cylinder and the head end of the other cylinder. When the first pilot valve is actuated in the opposite direction, it generally causes a flow of hydraulic fluid to the head end of the one cylinder and the rod end of the other cylinder. The first cylinder is typically coupled with the first arm, and the second cylinder is typically coupled with the second arm. Thus, actuating the first solenoid will cause the first and second arms to move to the left, for example, while actuating the second solenoid will cause the first and second arms to move to the right. Again, Thus, if the first and second arms of the hitch are symmetrical, the first and second arms will move laterally to the left or the right together, i.e., they are linked.

Figure 2:
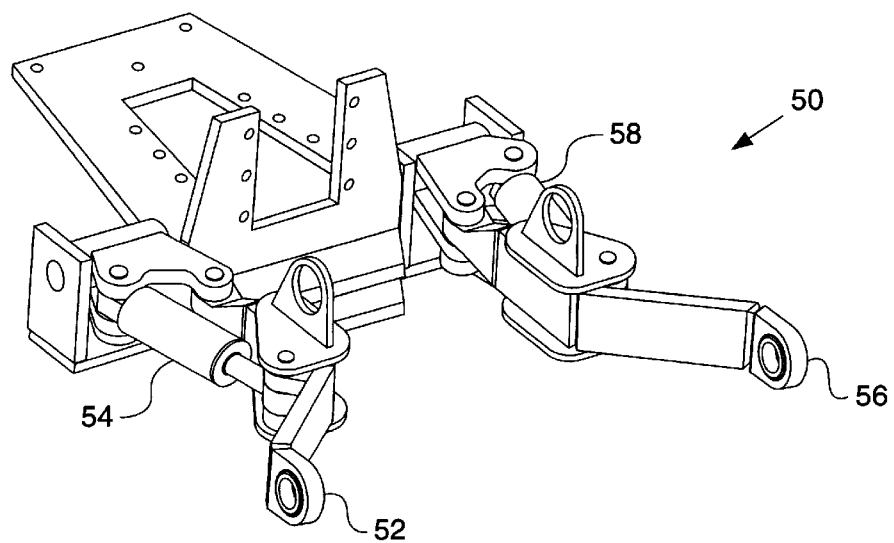
FIG. 2 is a perspective view of a hitch assembly according to one embodiment of the invention.

FIG. 2 is a perspective view of a hitch assembly 50 according to one embodiment of the invention. The hitch assembly 50 includes a first, or left arm 52 and a first cylinder 54 coupled with the first arm 52. The first cylinder 54 extends and contracts, thereby respectively moving the left arm 52 to the right and to the left, e.g., laterally, along a first axis. A second, or right arm 56 is coupled with a second cylinder 58. The second cylinder 56 extends and contracts, thereby respectively moving the right arm 56 to the left and to the right along the first axis. The first and second cylinders 54, 58 are typically coupled with the hydraulic pump system (not shown) by ways known to those skilled in the art.

Figure 3:
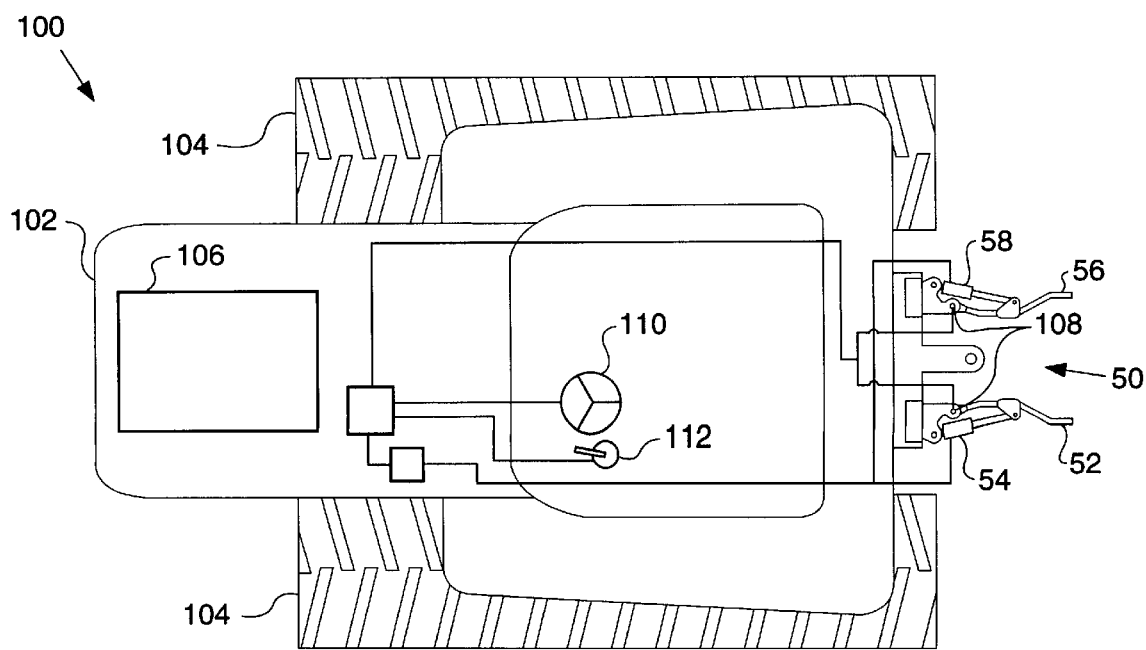
FIG. 3 is a top view and functional block diagram of a work machine according to one embodiment of the invention.

FIG. 3 is a top view and functional block diagram of a work machine 100, such as a tractor, according to one embodiment of the invention. The work machine 100 includes a frame 102, and a ground engaging traction device, such as a wheel or endless belt, e.g., a track 104, coupled with the frame 102. An engine 106 is coupled with the frame 102, and with the tracks 104. The engine 106 provides a locomotive force to the tracks 104 by ways known to those skilled in the art.

The hitch assembly 50 including the moveable left arm 52 and the moveable right arm 56 is coupled with the frame 102. Typically the left and right arms pivot around respective predetermined points, although lateral movement, e.g., translation, may also be possible. The first and second cylinders 54, 58 are respectively coupled with the left and right arms 52, 56 to cause the arms 52, 56 to pivot by ways known to those skilled in the art. Position sensors 108 are coupled with the left and right arms 52, 56 and transmit respective actual left arm and actual right arm positions by ways known to those skilled in the art.

A control input device, such as a joystick (not shown) or steering wheel 110 is coupled with the frame 102. The steering wheel 110 receives an input from an operator (not shown) and transmits a turn radius TURN RADIUS as a function of the input. A dial 112 receives an input from the operator and transmits the desired offset position OFFSET. The apparatus 10 is coupled with the steering wheel 110 to receive the turn radius TURN RADIUS, with the dial 112 to receive the desired offset position OFFSET, and with at least one of the position sensors 108 to receive the actual position ACTPOS of at least one of the arms of the hitch 50, or more typically an actual position of the centerline. The left and right arm positions may be processed by the apparatus 10 or by other circuitry (not shown) to produce the centerline position of the hitch 50, such as by averaging the left and right actual positions together. The apparatus 10 functions similarly to what is described above, and will not be repeated.

An actuating device 114, such as a hydraulic pump system is coupled with the apparatus 10 to receive the first and second activation signals ACTIV1, ACTIV2. The actuating device 114 includes the first and second pilot valves (not shown) and is coupled with the first and second cylinders 52, 56 to control their movement as described above. Alternately, the actuating device 114 may be an electric motor coupled with the left and right arms 52, 56, to move the left and right arms 52, 56 laterally by ways known to those skilled in the art. Other types of actuating devices known to those skilled in the art may also be used.

In another embodiment, the work machine 100 includes only a single position sensor 116 and a single cylinder 54, 58, or a single position sensor 116 and two cylinders 54, 58. The left and right arms 52, 56 are typically rigidly coupled together by ways known to those skilled in the art. The work machine 100 functions similarly to the single sensor embodiment described above, and will not be repeated.

In operation, the use of only a single sensor may require recalibration of the center position when the left and right arms are shifted equally towards or away from each other, such as by changing the width of an implement attached to the arms. The two sensor embodiments, however, automatically recalibrate the center position by averaging the left and right arm actual position signals.

An operator may control the position and offset of the hitch assembly 50, thereby controlling the position of a work implement (not shown) attached to the hitch assembly 50. By transmitting a desired center position as a function of the steering wheel position, the apparatus 10 allows for automatic shifting of the hitch assembly 50 when the work machine 100 turns. When a work implement coupled with a hitch assembly 50 provides a dragging force, such as a plow in the earth, appropriately shifting of the hitch assembly 50 will cause the dragging force to assist in turning the work machine 100. For example, when the work machine 100 makes a left turn, the hitch assembly 50 is automatically shifted to the left. The drag from the work implement exerts a counter clockwise torque (when viewed from above) on the work machine 100, thereby assisting in causing the work machine 100 to turn left. Similarly, when the work machine 100 makes a right turn, the hitch assembly 50 is shifted to the right.

Significantly, the shifting of the hitch assembly 50 may be accomplished automatically by reading the position of the steering wheel, and does not require the operator to monitor and interact with the apparatus 10 when the work machine 100 is in motion. The apparatus automatically senses when the work machine begins a turn, and also the direction of the turn.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for controlling a lateral position of a first member on a hitch of a work machine, comprising:
    a first processing device operable to receive a first signal indicative of a desired turn radius of the work machine and to transmit a first desired hitch position as a function of the first signal;
    a second processing device operable to receive a second signal indicative of an actual hitch position and coupled with the first processing device to receive the first desired hitch position, the second processing device operable to transmit a first error as a function of the second signal and the desired hitch position;
    a controller coupled with the second processing device to receive the first error, the controller operable to transmit a second error as a function of the first error; and
    a first member modulator coupled with the controller to receive the first error, the first member modulator operable to transmit a first activation signal as a function of the second error, the first activation signal operable to control the lateral position of the first member.

2. The apparatus of claim 1 wherein the first error comprises the difference between the desired hitch position and the actual hitch position.

3. The apparatus of claim 1 wherein the second error is a function of the first error, a first constant, and an integral of the first error.

4. The apparatus of claim 1, further comprising:
    a second member modulator coupled with the controller to receive the second error, the second member modulator operable to transmit a second activation signal as a function of the second error, the second activation signal operable to control the lateral position of the first member.

5. The apparatus of claim 4 wherein the first activation signal is complementary to the second activation signal.

6. An apparatus for controlling a lateral position of a first member on a hitch of a work machine, comprising:
    a first processing device operable to receive a first signal indicative of a desired turn radius of the work machine and to transmit a first desired hitch position as a function of the first signal;
    a second processing device operable to receive a second signal indicative of an offset and coupled with the first processing device to receive the first desired hitch position; the second processing device operable to transmit a second desired hitch position as a function of the second signal and the first desired hitch position;
    a third processing device operable to receive a third signal indicative of an actual hitch position and coupled with the second processing device to receive the second desired hitch position, the third processing device operable to transmit a first error as a function of the third signal and the desired hitch position;
    a controller coupled with the third processing device to receive the first error, the controller operable to transmit a second error as a function of the first error; and
    a first member modulator coupled with the controller to receive the first error, the first member modulator operable to transmit a first activation signal as a function of the second error, the first activation signal operable to control the lateral position of the first member.

7. The apparatus of claim 6 wherein the second desired hitch position comprises the sum of the first desired hitch position and the offset.

8. The apparatus of claim 6, further comprising:
    a second member modulator coupled with the controller to receive the second error, the second member modulator operable to transmit a second activation signal as a function of the second error, the second activation signal operable to control the lateral position of the first member.

9. A work machine, comprising:
    a frame;
    an engine coupled with the frame and operable to provide a locomotive force;
    a ground engaging traction device coupled with the frame and with the engine to receive the locomotive force, the ground engaging traction device operable to move relative to the frame as a function of the locomotive force;
    a hitch assembly coupled with the frame and having a first member capable of lateral movement along a first axis;
    a control input coupled with the frame, the control input providing a first signal indicative of a desired turn radius of the work machine;
    a first sensor coupled with the first member, the first sensor operable to transmit a second signal indicative of a first member actual position along the first axis;
    an apparatus for controlling a lateral position of the first member of the hitch assembly, comprising:
        a first processing device coupled with the control input to receive the first signal and to transmit a first desired hitch position as a function of the first signal;
        a second processing device coupled with the first sensor to receive the second signal and coupled with the first processing device to receive the first desired hitch position, the second processing device operable to transmit a first error as a function of the second signal and the desired hitch position;

a controller coupled with the second processing device to receive the first error, the controller operable to transmit a second error as a function of the first error; and a first member modulator coupled with the controller to receive the second error, the first member modulator operable to transmit a first activation signal as a function of the second error;

a second member modulator coupled with the controller to receive the second error, the second member modulator operable to transmit a second activation signal as a function of the second error;

an actuator coupled with the first member modulator to receive the first activation signal and with the second member modulator to receive the second activation signal, the actuator operable to control the lateral position of the first member along the first axis as a function of the first and second activation signals.

10. The work machine of claim 9 wherein the control input comprises a steering wheel.

11. A method for controlling a lateral position of a member on a hitch of a work machine, comprising:

determining a turn radius; and automatically adjusting the lateral position of the member as a function of the turn radius and turn direction.

12. The method of claim 11 wherein determining a turn radius comprises:

determining a magnitude of the turn radius; and determining a direction of the turn radius.

13. A method for controlling a position of a first member on a hitch of a work machine along a first axis, comprising:

receiving a first signal indicative of a desired turn radius of the work machine;

determining a desired hitch position as a function of the first signal;

receiving a second signal indicative of an actual hitch position;

determining a first error as a function of the first signal and the second signal;

determining a second error as a function of the first error;

determining a first activation signal as function of the second error, the first activation signal operable to control the position of the first member along the first axis; and transmitting the first activation signal.

14. The method of claim 13 wherein the first axis comprises a horizontal axis, and movement along the first axis comprises lateral movement.

15. The method of claim 13 wherein the second error is a function of the first error, a first constant, and an integral of the first error.

16. The method of claim 13, further comprising:

determining a second activation signal as function of the second error, the second activation signal operable to control the lateral position of the first member; and transmitting the second activation signal.

17. A method for controlling a lateral position of a first member on a hitch of a work machine along a first axis, comprising:

receiving a first signal indicative of a desired turn radius of the work machine;

determining a first desired hitch position as a function of the first signal;

receiving a second signal indicative of an offset;

determining a second desired hitch position as a function of the first desired hitch position and the second signal;

receiving a third signal indicative of an actual hitch position;

determining a first error as a function of the second desired hitch position and the third signal;

determining a second error as a function of the first error;

determining a first activation signal as function of the second error, the first activation signal operable to control the position of the first member along the first axis; and transmitting the first activation signal.

18. The method of claim 17 wherein the second error is a function of the first error, a first constant, and an integral of the first error.

19. The method of claim 17 wherein the first axis comprises a horizontal axis, and movement along the first axis comprises lateral movement.

20. The method of claim 17, further comprising:

determining a second activation signal as function of the second error, the second activation signal operable to control the position of the first member of the hitch on a work machine along the first axis; and transmitting the second activation signal.

* * * * *